United States Patent
Barnett, III

(10) Patent No.: US 10,133,088 B1
(45) Date of Patent: Nov. 20, 2018

(54) MODULAR SPECTACLES

(71) Applicant: Banjolitos, LLC, Winter Park, FL (US)

(72) Inventor: Charles Robert Barnett, III, Winter Park, FL (US)

(73) Assignee: Banjolitos, LLC, Winter Park, FL (US)

( * ) Notice: Subject to any disclaimer, the term of this patent is extended or adjusted under 35 U.S.C. 154(b) by 0 days.

(21) Appl. No.: 16/029,045

(22) Filed: Jul. 6, 2018

(51) Int. Cl.
*G02C 5/14* (2006.01)

(52) U.S. Cl.
CPC ............... *G02C 5/146* (2013.01); *G02C 5/14* (2013.01); *G02C 2200/06* (2013.01); *G02C 2200/08* (2013.01)

(58) Field of Classification Search
CPC ...... G02C 5/14; G02C 5/146; G02C 2200/06; G02C 2200/08
USPC ......................................................... 351/116
See application file for complete search history.

(56) References Cited

U.S. PATENT DOCUMENTS

| | | | | |
|---|---|---|---|---|
| 2,065,458 A * | 12/1936 | Hines | ...................... | G02C 9/04 351/140 |
| 2,586,546 A * | 2/1952 | Longenecker | ........... | G02C 1/06 351/102 |
| 3,155,982 A * | 11/1964 | Baratelli | ................. | A61F 9/027 2/12 |
| 3,705,760 A * | 12/1972 | Langendorfer | ........... | A61F 9/02 2/427 |
| 5,379,463 A * | 1/1995 | Schleger | ................. | A61F 9/029 2/431 |
| 7,014,313 B1 * | 3/2006 | Lee | ........................... | G02C 9/04 351/47 |
| 2003/0030770 A1* | 2/2003 | Strenk | ...................... | G02C 9/00 351/57 |
| 2004/0165142 A1* | 8/2004 | Xiao | ........................ | G02C 9/00 351/41 |
| 2007/0177098 A1* | 8/2007 | Lee | ........................... | G02C 9/00 351/47 |
| 2007/0236651 A1* | 10/2007 | Lee | ........................... | G02C 9/04 351/47 |
| 2008/0151184 A1* | 6/2008 | Spivey | ...................... | G02C 7/02 351/178 |
| 2014/0285763 A1* | 9/2014 | Bush | ........................ | G02C 9/02 351/57 |

* cited by examiner

*Primary Examiner* — William R Alexander
(74) *Attorney, Agent, or Firm* — Mark Terry

(57) ABSTRACT

Modular spectacles that are assembled and disassembled without the use of tools are disclosed. The modular spectacles comprise a pair of lenses, a middle frame element including a pair of rims for accepting the pair of lenses and a slot on each side, a front frame element with a slot on each side of the front frame element, wherein portions of the front frame element extend over portions of the pair of rims of the middle frame element, a rear frame element similar to the front frame element, and a pair of temples with compressible ends that fit securely within the slots, wherein the lenses are placed within the rims, the middle frame element is placed between the front and rear frame elements, and the temples are inserted into the slots, such that the frame elements are secured together, and the lenses are held in place by the frame elements.

20 Claims, 9 Drawing Sheets

MODULAR SPECTACLES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to field of spectacles or eyeglasses, and more specifically to the field of design and construction of spectacles and eyeglasses.

BACKGROUND

Eyeglasses, or spectacles, are devices consisting of glass or hard plastic lenses mounted in a frame that holds them in front of a person's eyes, typically using a bridge over the nose and arms, or temples, which rest over the ears. The lenses may be corrective lenses if the wearer requires their eyesight to be corrected. People are more likely to need eyeglasses the older they get with most people between the age of 65-75 wearing corrective lenses. Sunglasses allow better vision in bright daylight and may protect one's eyes against damage from high levels of ultraviolet light. Typical sunglasses are darkened for protection against bright light or glare.

The most common configuration of spectacles or eyeglasses comprises the lenses being secured to the frame in a substantially permanent fashion by use of an encircling band of metal or plastic which is maintained in a closed position by use of a screw, rivet or the like. In this configuration, custom lenses must be employed to fit precisely within the frame configuration used. The particular thickness of the lens, corresponding to the power and/or style of the lens, must be compatible with the particular frame selected by the wearer. As a result, significant time and effort must be expended, due to the required customization, to assemble an eyeglass assembly. Still further, a person in need of reading eyeglasses does not have a wide range of flexibility in their selection of frames due to the limited lens shape and thickness selection for that particular frame. Since typical eyeglass reader frames require a particular lens shape and thickness for compatibility purposes, a person in need of a strong powered lens would likely have a heavy, uncomfortable and cosmetically unappealing appearance.

Spectacle frames are already known in which the form remains constant while the color varies, so that they can be selected according to the user's taste. On the other hand, frames are known which have the same base frame, wherein the surface can be freely selected in the size or shape. However, the assembly of spectacles with such frames is relatively complex and must be performed usually by a specialist. In addition, the eyeglasses, and their appearance cannot be so easily changed and adapted. Therefore, in practice, users often purchase multiple different eyeglasses for situations requiring different lenses, aesthetics or colors. This can be costly for users requiring large numbers of eyeglasses for different situations.

As a result, there exists a need for improvements over the prior art and, more particularly, for simpler eyeglasses or spectacles that are more versatile and offer more options to users.

SUMMARY

Modular spectacles that are assembled and disassembled without the use of tools are disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, modular spectacles that are assembled and disassembled without the use of tools is disclosed. The modular spectacles comprise a pair of lenses, a middle frame element including a pair of rims defining orifices for accepting the pair of lenses and a slot on each side of the middle frame element, a front frame element having a length that is substantially coextensive with a length of the middle frame element, and a slot on each side of the front frame element, such that when the slots of the front frame element are aligned with the slots of the middle frame element, portions of the front frame element extend over a portion of the orifices defined by the pair of rims, a rear frame element having a length that is substantially coextensive with the length of the middle frame element, and a slot on each side of the rear frame element, such that when the slots of the rear frame element are aligned with the slots of the middle frame element, portions of the rear frame element extend over a portion of the orifices defined by the pair of rims, and, a pair of temples with compressible ends that fit securely within the slots in the front, rear and middle frame elements, such that when said compressible ends are compressed, inserted into said slots, and released, said compressible ends expand and are secured within said slots, wherein the pair of lenses are placed within the pair of rims, the middle frame element is placed between the front and rear frame elements such that the slots of the middle frame element align with the slots of the front and rear frame elements, and the compressible ends of the pair of temples are inserted into the slots of the front, rear and middle frame elements and released, such that the front, rear and middle frame elements are secured together, and the pair of lenses are held securely in place by the front, rear and middle frame elements.

Additional aspects of the disclosed embodiments will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
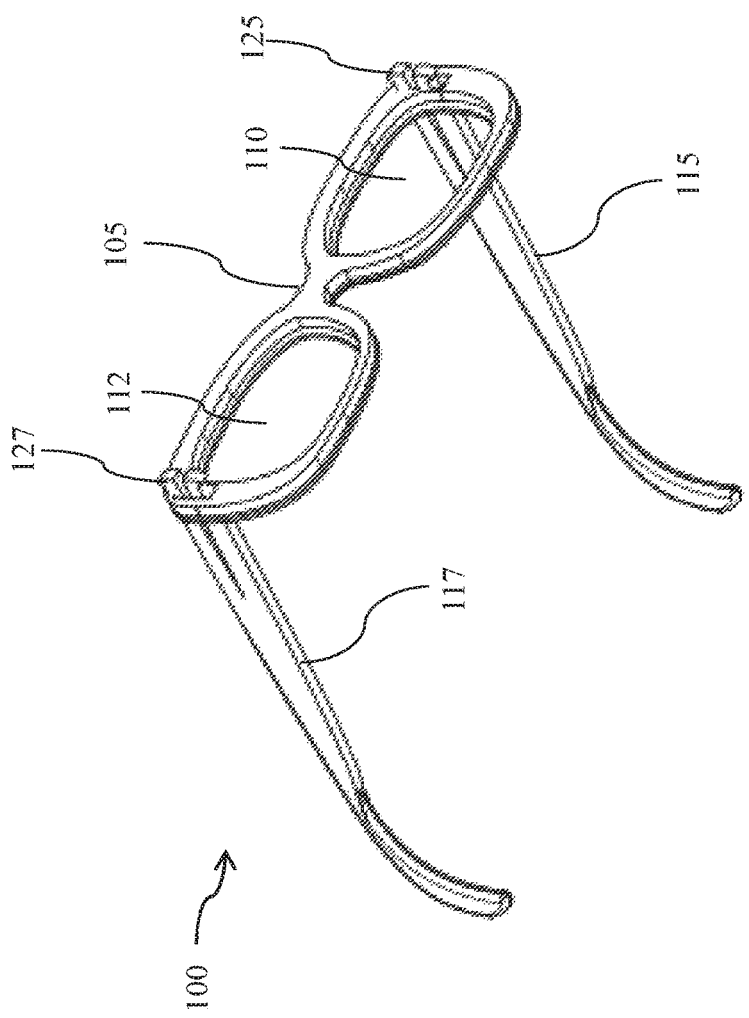
FIG. 1 is a bottom perspective view of an illustration of modular spectacles in an assembled state, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve of the prior art by disclosing a simple, inexpensive and easily used modular spectacles system wherein temples, frame members and lenses may be easily interchanged or exchanged without the use of tools and without a large expenditure of time. Thus, a wearer with a single pair of lenses may have different colors, shapes and styles of temples and frame elements available for use at any time. Therefore, a single pair of prescription lenses can be converted from a conservative office style to a sporty outdoors style in a matter of seconds without the use of tools. The disclosed embodiments therefore save significant time and effort required to assemble an eyeglass assembly. The disclosed embodiments further provide a wearer with a wide range of flexibility in their selection of frames and temples. Therefore, the disclosed embodiments reduce or eliminate the need for users to purchase multiple different eyeglasses for situations requiring different lenses, aesthetics or colors, thereby saving the user time and money.

FIG. 1 is a bottom perspective view of an illustration of modular spectacles 100 in an assembled state, according to an example embodiment. The modular spectacles 100 may be assembled and disassembled without the use of tools. The modular spectacles 100 comprise a frame assembly 105 that holds a pair of lenses 110, 112 (a left lens 110 and right lens 112) and a pair of temples 115, 117 (left temple 115, right temple 117). The proximal tip 125 of left temple 115 is seen extending through the frame assembly 105. The proximal tip 127 of right temple 117 is also seen extending through the frame assembly 105. The temples 115, 117 comprise extended arms located on the sides of the frame assembly 105 that extend from the frame assembly 105 and over the ears to keep the spectacles on the wearer's face.

Figure 2:
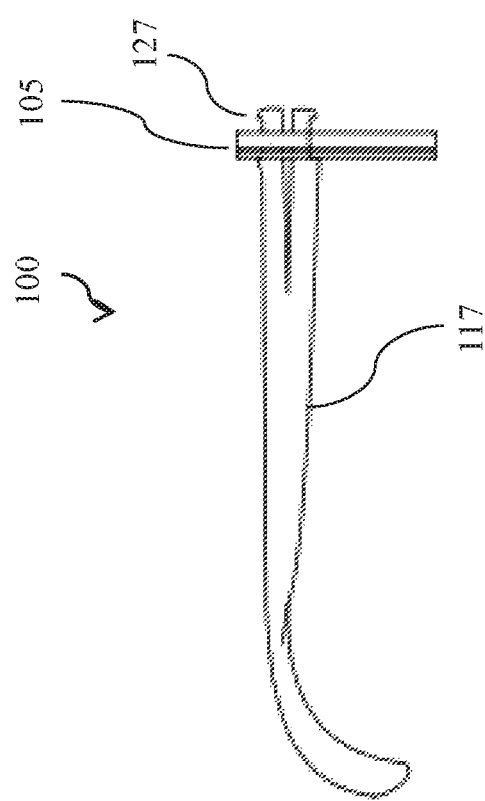
FIG. 2 is a side view of an illustration of the modular spectacles in an assembled state, according to an example embodiment.

FIG. 2 is a side view of an illustration of the modular spectacles 100 in an assembled state, according to an example embodiment. FIG. 2 shows the frame assembly 105 and the proximal tip 127 of right temple 117 extending through the frame assembly 105.

Figure 3:
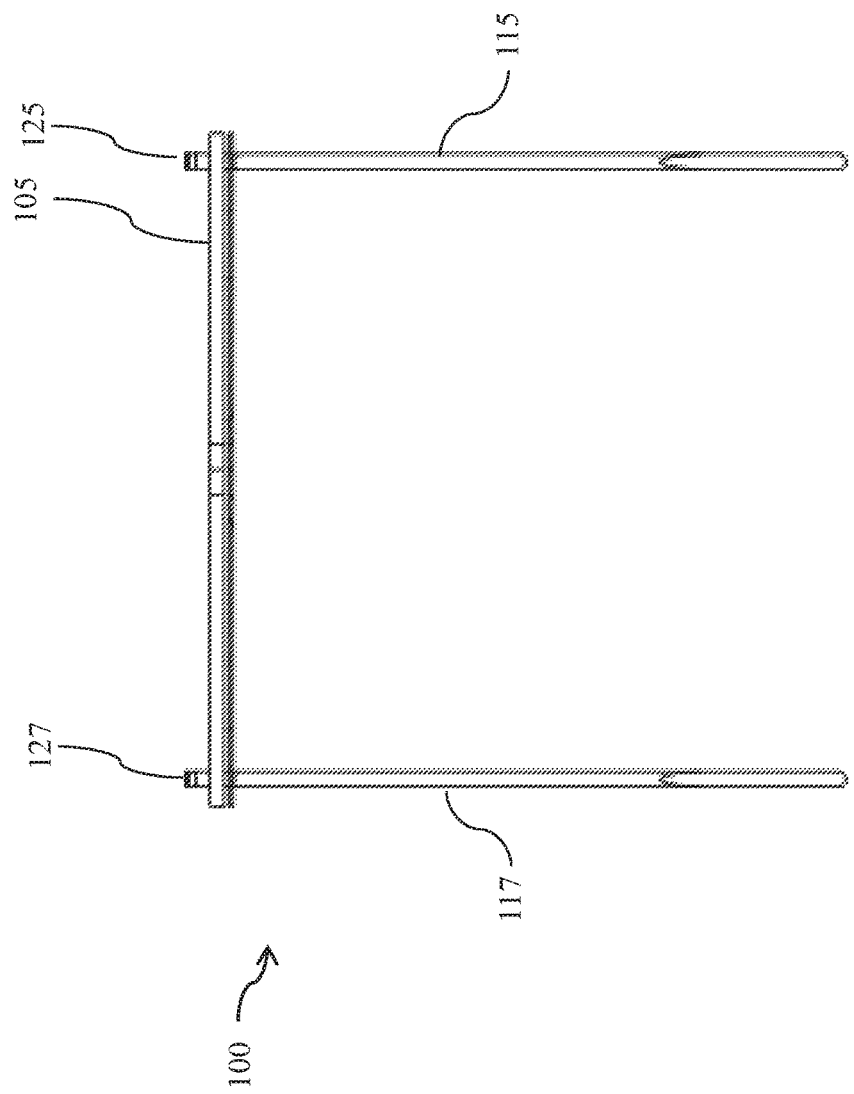
FIG. 3 is a bottom view of an illustration of the modular spectacles in an assembled state, according to an example embodiment.

FIG. 3 is a bottom view of an illustration of the modular spectacles 100 in an assembled state, according to an example embodiment. FIG. 3 shows the frame assembly 105, the proximal tip 125 of left temple 115 extending through the frame assembly 105, and the proximal tip 127 of right temple 117 extending through the frame assembly 105.

Figure 4:
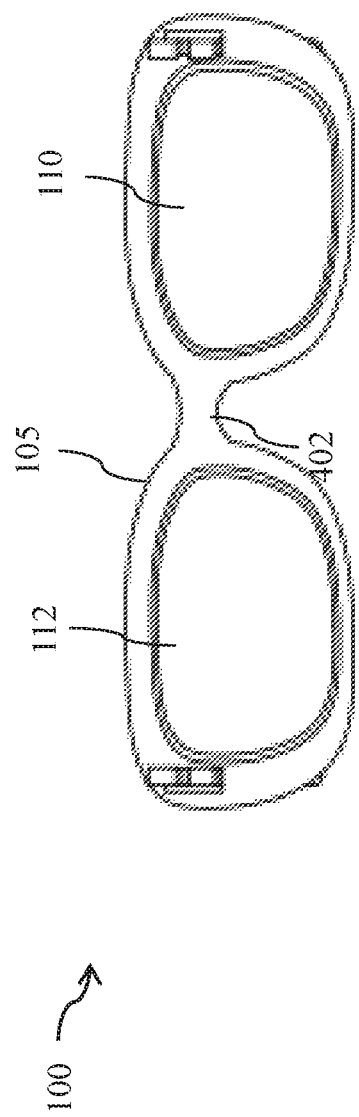
FIG. 4 is a front view of an illustration of the modular spectacles in an assembled state, according to an example embodiment.

FIG. 4 is a front view of an illustration of the modular spectacles 100 in an assembled state, according to an example embodiment. FIG. 4 shows the frame assembly 105 that holds the pair of lenses 110, 112 (a left lens 110 and right lens 112). FIG. 4 shows that the frame assembly 105 may include a pair of rims that define a pair of orifices that accept the pair of lenses, wherein the pair of rims are joined by a bridge 402. The bridge 402 extends in a region generally corresponding to the region between the eyes of the wearer. The bridge 402 is the arched piece in the front center of the frame assembly 105 that rests on the user's nose and is designed to bear most of the glasses' weight. Other suitable configurations can be used including, but not limited to, a brow bar that forms at least a portion of, or, in some embodiments, the entirety of, the bridge.

Figure 5:
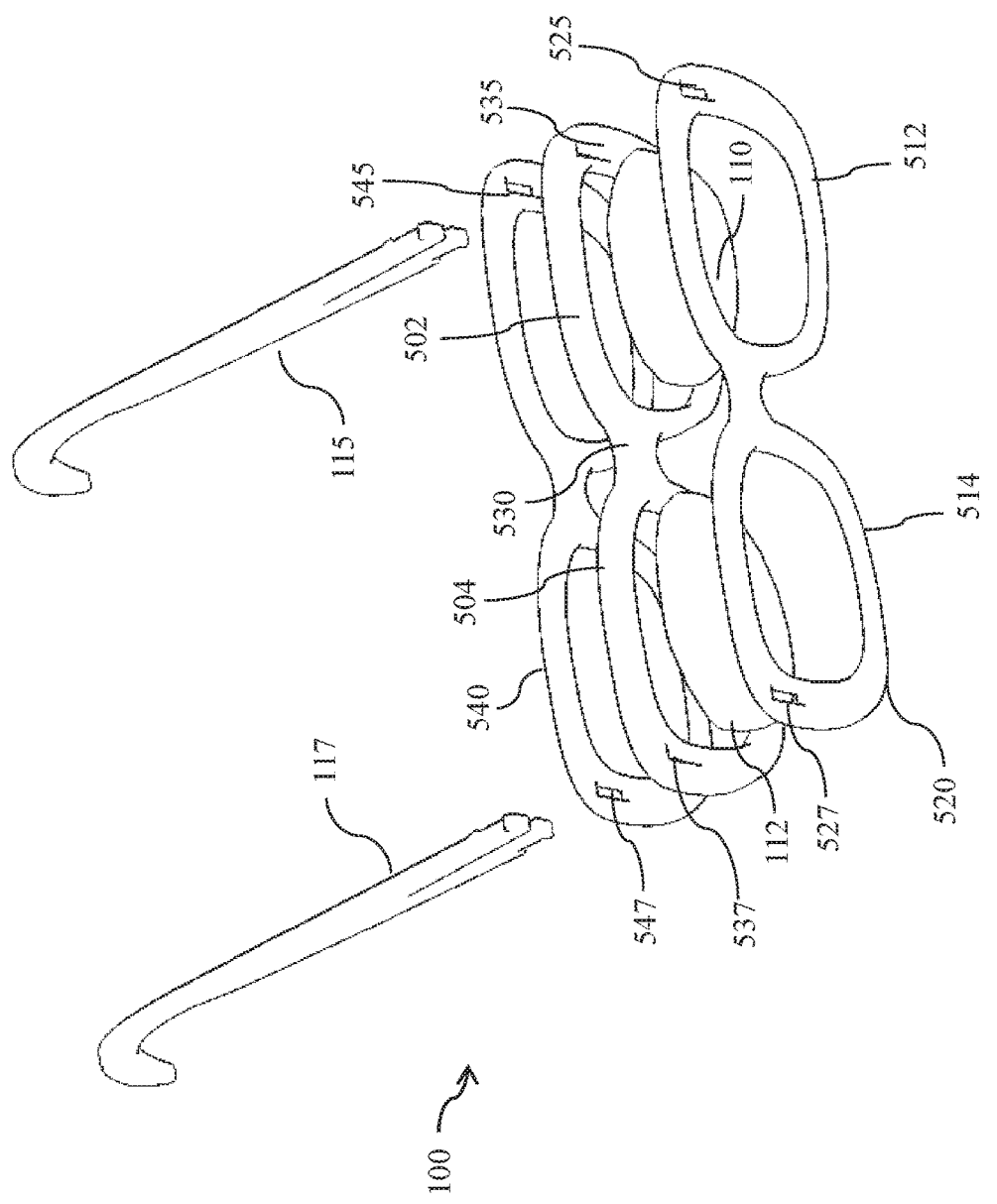
FIG. 5 is a top perspective view of an illustration of the modular spectacles in a disassembled state, according to an example embodiment.

FIG. 5 is a top perspective view of an illustration of the modular spectacles 100 in a disassembled state, according to an example embodiment. The modular spectacles 100 may be assembled and disassembled without the use of tools is disclosed. The modular spectacles 100 comprise a pair of lenses 110, 112, and the frame assembly 105 is composed of three frame elements: a front frame element 520, a middle frame element 530 and a rear frame element 540. The middle frame element 530 includes a pair of rims 502, 504 defining orifices for accepting the pair of lenses and a slot (535, 537) on each side of the middle frame element. The pair of rims 502, 504 may include a grooved or stepped cradle or inner surface (not shown) to hold the lenses 110, 112 in place. The slots 535, 537 may be rectangular, oval, circular, square, keyhole shaped, hexagonal, pentagonal, octagonal, star shaped, or the like.

The lenses 110, 112 may be of any shape or size. The modular spectacles 100 can be used with corrective or prescriptive lenses, polarized lenses, or nonprescription lenses, such as with clear accessory lenses to alter the appearance or color, or to provide protection from ultraviolet (UV) rays (UV-A and UV-B type). The lenses 110, 112 can be made of any suitable material, including standard plastic, high-index plastic, polycarbonate, trivex, hard resin (CR-39), and crown glass.

The frame assembly 105 further includes the front frame element 520 having a length that is substantially coextensive with a length of the middle frame element 530, and a slot (525, 527) on each side of the front frame element, such that when the slots of the front frame element are aligned with the slots of the middle frame element, portions of the front frame element extend over a portion of the orifices defined by the pair of rims 502, 504. That is, the orifice defined by the pair of rims 512, 514 of the front frame element 520 may be smaller than the orifice defined by the pair of rims 502, 504 of the middle frame element 530, such that portions of the front frame element extend over the orifices defined by the pair of rims 502, 504. The front frame element 520 is not provided with any lenses to be secured within the pair of rims 512, 514. The slots 525, 527 may be rectangular, oval, circular, square, keyhole shaped, hexagonal, pentagonal, octagonal, star shaped, or the like.

FIG. 5 shows that front frame element 520 has a full pair of rims 512, 514 defining substantially complete circles or ellipses. In one embodiment, the front frame element further comprises a portion that is coextensive with at least a portion of the pair of rims 502, 504 of the middle frame element 530. That is, in one embodiment, the front frame element 520 includes a pair of rims that each define a portion of a circle or ellipse, i.e., an in complete circle or ellipse.

The frame assembly 105 further includes the rear frame element 540 having a length that is substantially coextensive with the length of the middle frame element 530, and a slot (545, 547) on each side of the rear frame element 540, such that when the slots 545, 547 of the rear frame element are aligned with the slots of the middle frame element, portions of the rear frame element extend over a portion of the orifices defined by the pair of rims 502, 504. That is, as described above for the front frame element 520, the orifice defined by the pair of rims of the rear frame element 540 may be smaller than the orifice defined by the pair of rims 502, 504 of the middle frame element 530, such that portions of the rear frame element extend over the orifices defined by the pair of rims 502, 504. The rear frame element 540 is not provided with any lenses to be secured within the pair of rims of the rear frame element. The slots 545, 547 may be rectangular, oval, circular, square, keyhole shaped, hexagonal, pentagonal, octagonal, star shaped, or the like.

FIG. 5 shows that rear frame element 540 has a full pair of rims defining substantially complete circles or ellipses. In one embodiment, the rear frame element further comprises a portion that is coextensive with at least a portion of the pair of rims 502, 504 of the middle frame element 530. That is, in one embodiment, the rear frame element 540 includes a pair of rims that each define a portion of a circle or ellipse, i.e., an in complete circle or ellipse.

The modular spectacles 100 also include a pair of temples 115, 117 with compressible ends that fit securely within the slots in the front, rear and middle frame elements, such that when said compressible ends are compressed, inserted into said slots, and released, said compressible ends expand and are secured within said slots. When the pair of lenses 110, 112 are placed within the pair of rims 502, 504, the middle frame element is placed between the front and rear frame elements such that the slots of the middle frame element align with the slots of the front and rear frame elements, and the compressible ends of the pair of temples are inserted into the slots of the front, rear and middle frame elements and released, such that the front, rear and middle frame elements are secured together, then the pair of lenses are held securely in place by the front, rear and middle frame elements.

Figure 6:
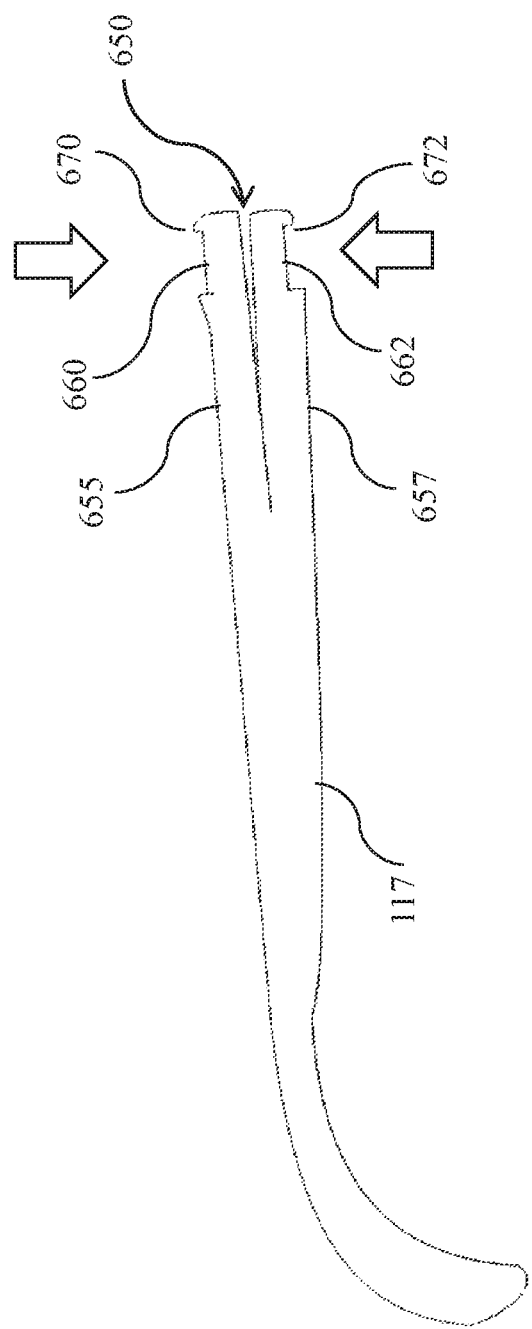
FIG. 6 is a side view of an illustration of the temple of the modular spectacles, according to an example embodiment.

FIG. 6 is a side view of an illustration of the temple 117 of the modular spectacles 100, according to an example embodiment. The right temple 117 comprises a pair of split arms 655, 657 extending out in a V-formation, defining a V-shaped slit 650 running longitudinally along the longitudinal main axis of the temple. The right temple 117 includes square shaped carve-out portions 660, 662 on the distal end of each of the split arms 655, 657. The carve outs define protruding or perpendicular elements 670, 672 that extends perpendicularly from the distal end of each of the split arms 655, 657. The arrangement above results in the temple 117 having a compressible end, in that the distal ends of temple 117 can be compressed using one's fingers (in the direction of the arrows in FIG. 6), such that the split arms 655, 657 are brought together. In this fashion, when compressed, the ends of the split arms 655, 657 may be inserted into the slots of the rear, middle and front frame elements 540, 530, 520 when the frame elements are stacked in a sandwich formation. Once inserted into said slots, the compressible ends may be released, which results in the compressible ends expanding (in a direction opposite to the arrows in FIG. 6) and pushing against the interior surface of the slots of the rear, middle and front frame elements. The interior surface of the slots of the rear, middle and front frame elements rest against the square shaped carve-out portions 660, 662 on the distal end of each of the split arms 655, 657. The protruding or perpendicular elements 670, 672 that extends perpendicularly from the distal end of each of the split arms 655, 657 prevent the rear, middle and front frame elements from being pulled outwards and away from the temples. Therefore, the temples maintain the rear, middle and front frame elements securely in place.

Figure 7:
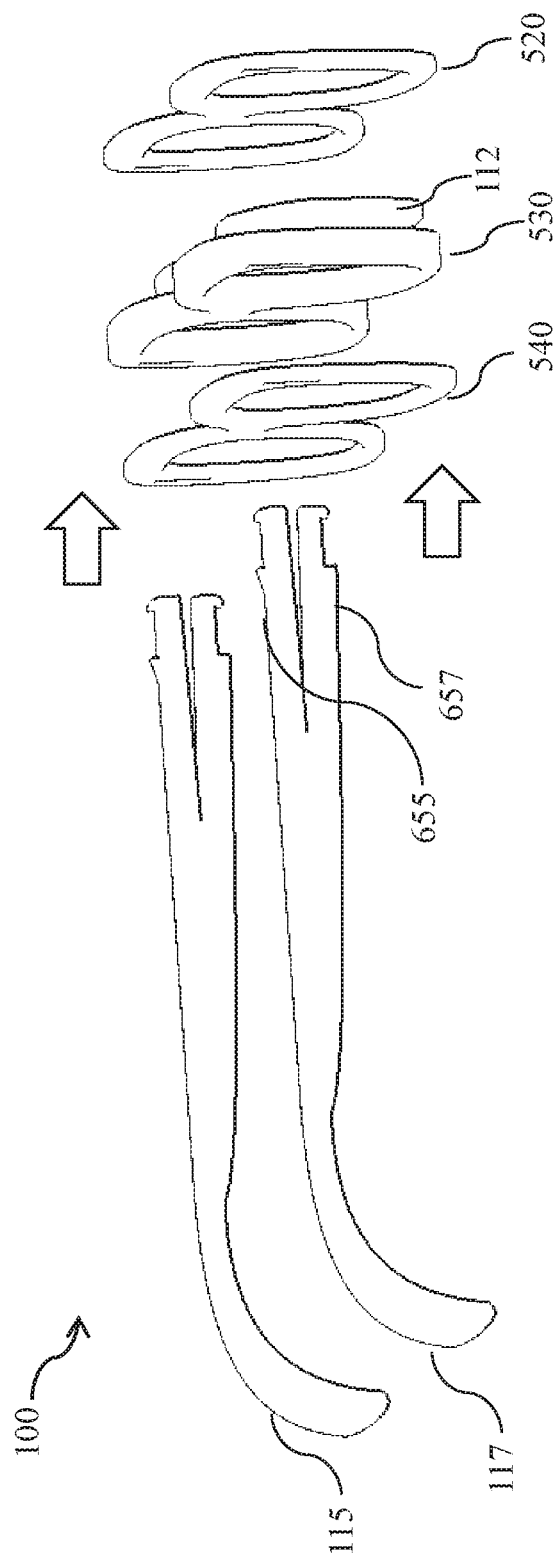
FIG. 7 is a side perspective view of an illustration of the modular spectacles in a disassembled state, according to an example embodiment.

FIG. 7 is a side perspective view of an illustration of the modular spectacles 100 in a disassembled state, according to an example embodiment. FIG. 6 shows how the rear, middle and front frame elements 540, 530, 520 are stacked in a sandwich formation, with the temples 115, 117 acting as the fastener that fastens the rear, middle and front frame elements together.

As explained above, the compressible ends of the temples 115, 117 can be compressed using one's fingers, such that the split arms 655, 657 are brought together. In this fashion, when compressed, the ends of the split arms may be inserted into the slots of the rear, middle and front frame elements 540, 530, 520 when they are stacked in a sandwich formation. Therefore, the temples maintain the rear, middle and front frame elements securely in place.

The modular spectacles 100 are assembled as follows. First, the lenses 110, 112 are placed in the grooved cradle (not shown) of the rims 502, 504 of the middle frame element 530. Next, the middle frame element 530 is aligned and stacked in between the front frame element 520 and the rear frame element 540 such that slot 527 aligns with slots 537 and 547 and such that slot 525 aligns with slot 535 and sot 545. The orifices defined by the rims of the front frame element 520 and the orifices defined by the rims of the rear frame element 540 have a smaller diameter than the rims 502, 504 of the middle frame element 530, such that the lenses 110, 112 in the middle frame element 530 are secured in place by the front and rear frame elements.

Next, the split arms 655, 657 of the temple 117 are squeezed or compressed by hand (using finger strength) and inserted in the direction of the arrow (shown in FIG. 7) through the slots 527, 537, 547 of the front, middle and rear frame members. Also, the split arms of the temple 115 are squeezed and inserted in the direction of the arrow (shown in FIG. 7) through the slots 525, 535, 545 of the front, middle and rear frame members. Once the temples are fully inserted, the split arms are released, and the carve-out portions press against the interior surfaces of the slots and lock the front, middle and rear frame elements in place.

The modular spectacles 100 are disassembled as follows. The split arms 655, 657 of the temple 117 are squeezed by hand (using finger strength) and removed opposite to the direction of the arrow (shown in FIG. 7) from the slots 527, 537, 547 of the front, middle and rear frame members. Also, the split arms of the temple 115 are squeezed and removed opposite to the direction of the arrow (shown in FIG. 7) from the slots 525, 535, 545 of the front, middle and rear frame members. Once the temples 115, 117 are removed, the front and rear frame elements can be taken off the middle frame element, and the lenses 110, 112 are no longer held in place. The modular spectacles 100 are now fully disassembled.

Figure 8:
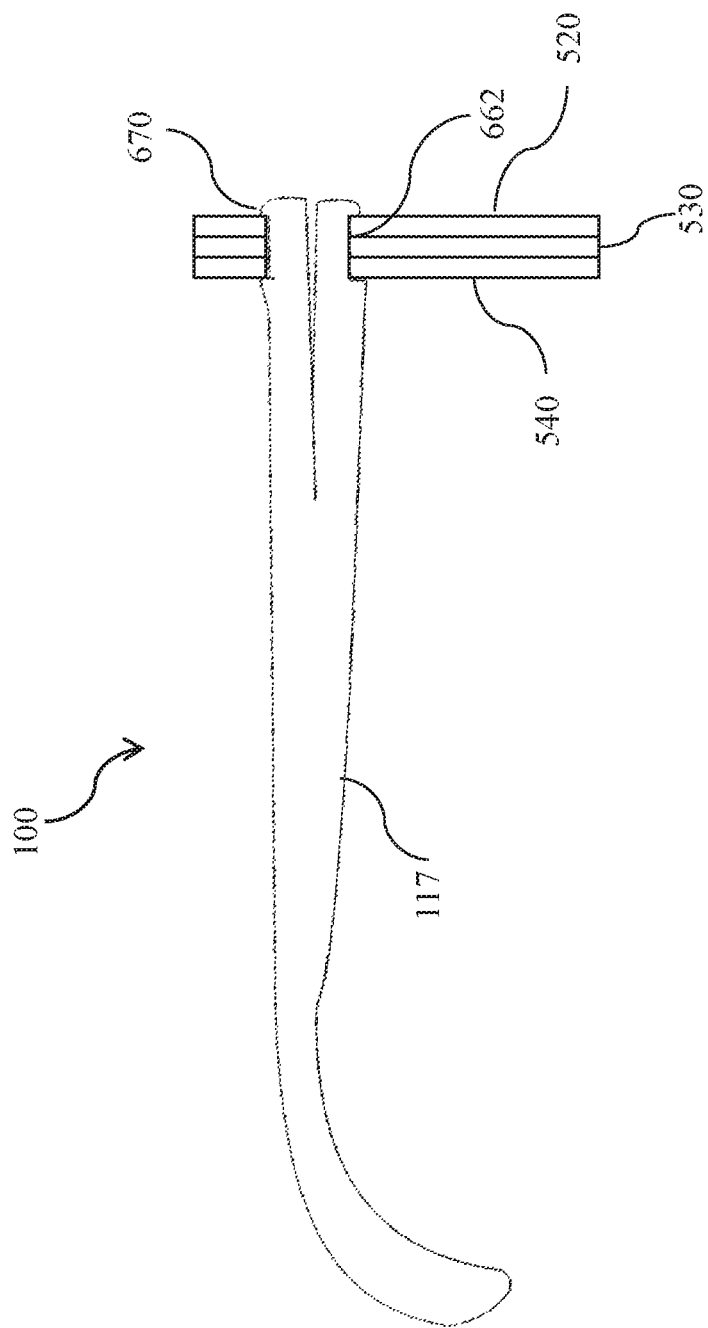
FIG. 8 is a side cross sectional view of an illustration of the modular spectacles, according to an example embodiment.

FIG. 8 is a side cross sectional view of an illustration of the modular spectacles 100, according to an example embodiment. FIG. 8 shows a cross section along a main longitudinal axis of the temple 117. FIG. 8 shows that the split arms of the temple 117 have been inserted into the slots of the rear, middle and front frame elements 540, 530, 520 when the frame elements are stacked in a sandwich formation. Once inserted, the compressible ends expand and push against the interior surface of the slots of the rear, middle and front frame elements. The interior surface of the slots of the rear, middle and front frame elements rest securely against the square shaped carve-out portions 660, 662 on the distal end of each of the split arms of temple 117. FIG. 8 shows that the square shaped carve-out portions 660, 662 are shaped precisely to fit the interior surface of the slots of the rear, middle and front frame elements. The protruding or perpendicular elements 670, 672 that extends perpendicularly from the distal end of each of the split arms 655, 657 prevent the rear, middle and front frame elements from being pulled outwards and away from the temples. Therefore, the temples maintain the rear, middle and front frame elements securely in place.

Figure 9:
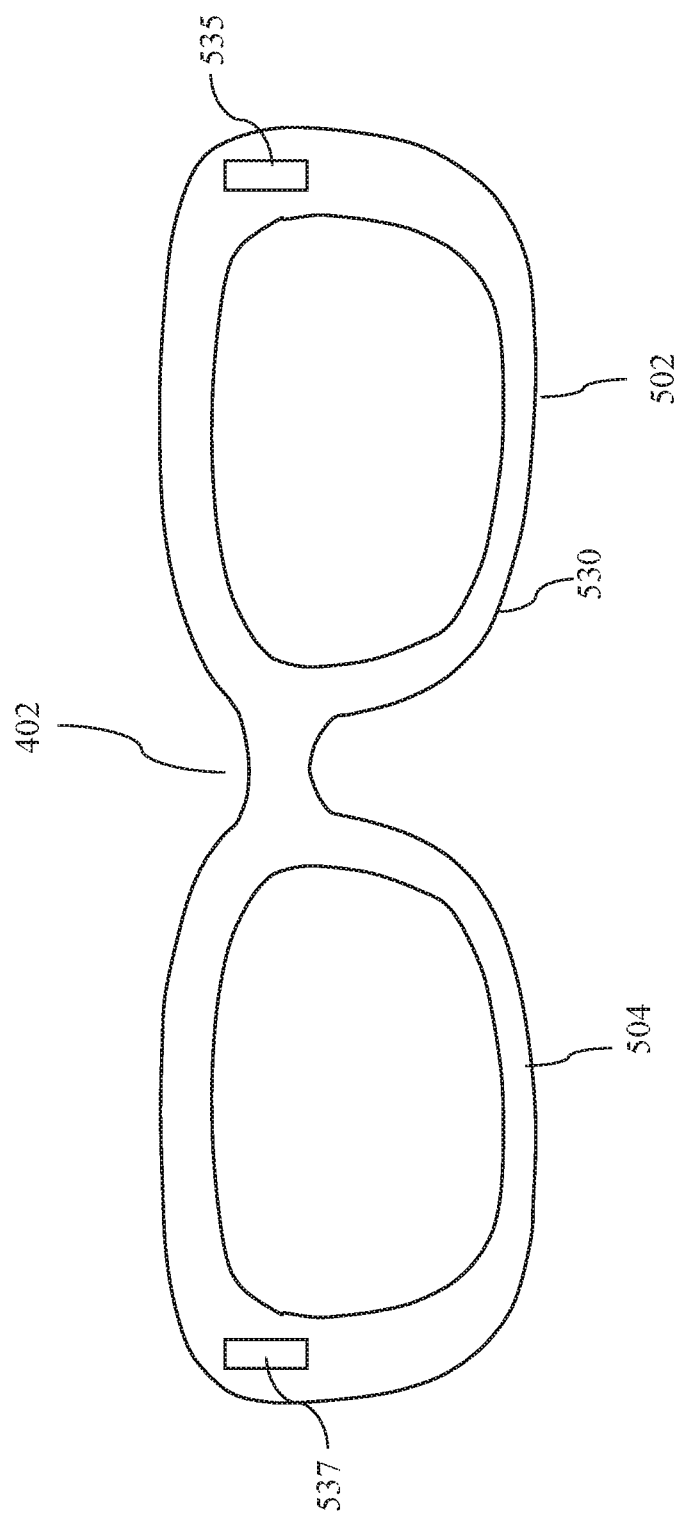
FIG. 9 is a front view of an illustration of the middle frame element of the modular spectacles, according to an example embodiment.

FIG. 9 is a front view of an illustration of the middle frame element 530 of the modular spectacles 100, according to an example embodiment. The middle frame element 530 includes a pair of rims 502, 504 defining orifices for accepting the pair of lenses and a slot (535, 537) on each side of the middle frame element. The pair of rims 502, 504 (connected by bridge 402) may include a grooved or stepped cradle or inner surface (not shown) to hold the lenses 110, 112 in place. The slots 535, 537 may be rectangular, oval, circular, square, keyhole shaped, hexagonal, pentagonal, octagonal, star shaped, or the like.

In one embodiment, any of the components of the modular spectacles 100 described above may be composed of wood, metal, alloy, cement, ceramic, plastic, rubber, any thermoset elastomer, polyethylene, PVC, any combination of the foregoing, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. Modular spectacles that are assembled and disassembled without the use of tools, comprising:
   a) a pair of lenses;
   b) a middle frame element including a pair of rims defining orifices for accepting the pair of lenses and a slot on each side of the middle frame element;
   c) a front frame element having a length that is substantially coextensive with a length of the middle frame element, and a slot on each side of the front frame element, such that when the slots of the front frame element are aligned with the slots of the middle frame element, portions of the front frame element extend over a portion of the orifices defined by the pair of rims;
   d) a rear frame element having a length that is substantially coextensive with the length of the middle frame element, and a slot on each side of the rear frame element, such that when the slots of the rear frame element are aligned with the slots of the middle frame element, portions of the rear frame element extend over a portion of the orifices defined by the pair of rims; and
   e) a pair of temples with compressible ends that fit securely within the slots in the front, rear and middle frame elements, such that when said compressible ends are compressed, inserted into said slots, and released, said compressible ends expand and are secured within said slots;
   f) wherein the pair of lenses are placed within the pair of rims, the middle frame element is placed between the front and rear frame elements such that the slots of the middle frame element align with the slots of the front and rear frame elements, and the compressible ends of the pair of temples are inserted into the slots of the front, rear and middle frame elements and released, such that the front, rear and middle frame elements are secured together, and the pair of lenses are held securely in place by the front, rear and middle frame elements.

2. The modular spectacles of claim 1, wherein the middle frame element further comprises a bridge for coupling the pair of rims.

3. The modular spectacles of claim 2, wherein the slot on each side of the middle frame element further comprises a rectangular orifice.

4. The modular spectacles of claim 3, wherein the front frame element further comprises a portion that is coextensive with at least a portion of the pair of rims of the middle frame element.

5. The modular spectacles of claim 4, wherein the slot on each side of the front frame element further comprises a rectangular orifice.

6. The modular spectacles of claim 5, wherein the rear frame element further comprises a portion that is coextensive with at least a portion of the pair of rims of the middle frame element.

7. The modular spectacles of claim 6, wherein the slot on each side of the rear frame element further comprises a rectangular orifice.

8. The modular spectacles of claim 7, wherein the compressible ends of each of the pair of temples further comprise two substantially parallel arms with a perpendicular portion at the end of each arm.

9. Modular spectacles that are assembled and disassembled without the use of tools, comprising:
   a) a left lens and a right lens;
   b) a middle frame element including a left rim defining a left orifice for the left lens, a right rim defining a right orifice for the right lens, a bridge connecting the left and right rims, and a slot on each side of the middle frame element, wherein each rim is configured to accept each lens;

c) a front frame element having a length that is substantially coextensive with a length of the middle frame element, and a slot on each side of the front frame element, such that when the slots of the front frame element are aligned with the slots of the middle frame element, portions of the front frame element extend over a portion of the left and right orifices defined by the pair of rims;

d) a rear frame element having a length that is substantially coextensive with the length of the middle frame element, and a slot on each side of the rear frame element, such that when the slots of the rear frame element are aligned with the slots of the middle frame element, portions of the rear frame element extend over a portion of the left and right orifices defined by the pair of rims; and e) a left temple and a right temple, wherein each temple includes compressible ends that fit securely within the slots in the front, rear and middle frame elements, such that when said compressible ends are compressed, inserted into said slots, and released, said compressible ends expand and are secured within said slots;

f) wherein the left and right lenses are placed within the left and right rims, respectively, of the middle frame element, the middle frame element is placed between the front and rear frame elements such that the slots of the middle frame element align with the slots of the front and rear frame elements, the compressible ends of the left temple are inserted into left side slots of the front, rear and middle frame elements and released, and the compressible ends of the right temple are inserted into right side slots of the front, rear and middle frame elements and released, such that the front, rear and middle frame elements are secured together, and the left and right lenses are held securely in place by the front, rear and middle frame elements.

10. The modular spectacles of claim 9, wherein the middle frame element further comprises a bridge for coupling the left and right rims.

11. The modular spectacles of claim 10, wherein the slot on each side of the middle frame element further comprises a rectangular orifice.

12. The modular spectacles of claim 11, wherein the front frame element further comprises a portion that is coextensive with at least a portion of the left and right rims of the middle frame element.

13. The modular spectacles of claim 12, wherein the slot on each side of the front frame element further comprises a rectangular orifice.

14. The modular spectacles of claim 13, wherein the rear frame element further comprises a portion that is coextensive with at least a portion of the left and right rims of the middle frame element.

15. The modular spectacles of claim 14, wherein the slot on each side of the rear frame element further comprises a rectangular orifice.

16. The modular spectacles of claim 15, wherein the compressible ends of each of the left and right temples further comprise two substantially parallel arms with a perpendicular portion at the end of each arm.

17. Modular spectacles that are assembled and disassembled without the use of tools, comprising:

a) a pair of lenses;

b) a middle frame element including a pair of rims defining orifices for accepting the pair of lenses and a slot on each side of the middle frame element, wherein each rim forms an orifice;

c) a front frame element having a pair of rims, and a slot on each side of the front frame element, such that when the slots of the front frame element are aligned with the slots of the middle frame element, portions of the pair of rims of the front frame element extend over a portion of the orifices defined by the pair of rims;

d) a rear frame element having a length that is substantially coextensive with the length of the middle frame element, and a slot on each side of the rear frame element, such that when the slots of the rear frame element are aligned with the slots of the middle frame element, portions of the rear frame element extend over a portion of the orifices defined by the pair of rims; and e) a pair of temples with compressible ends that fit securely within the slots in the front, rear and middle frame elements, such that when said compressible ends are compressed, inserted into said slots, and released, said compressible ends expand and are secured within said slots;

f) wherein the pair of lenses are placed within the pair of rims, the middle frame element is placed between the front and rear frame elements such that the slots of the middle frame element align with the slots of the front and rear frame elements, and the compressible ends of the pair of temples are inserted into the slots of the front, rear and middle frame elements and released, such that the front, rear and middle frame elements are secured together, and the pair of lenses are held securely in place by the front, rear and middle frame elements.

18. The modular spectacles of claim 17, wherein the middle frame element further comprises a bridge for coupling the pair of rims.

19. The modular spectacles of claim 18, wherein the slot on each side of the middle frame element further comprises a rectangular orifice.

20. The modular spectacles of claim 19, wherein the slot on each side of the front and rear frame elements further comprises a rectangular orifice.

* * * * *